Figure 4:
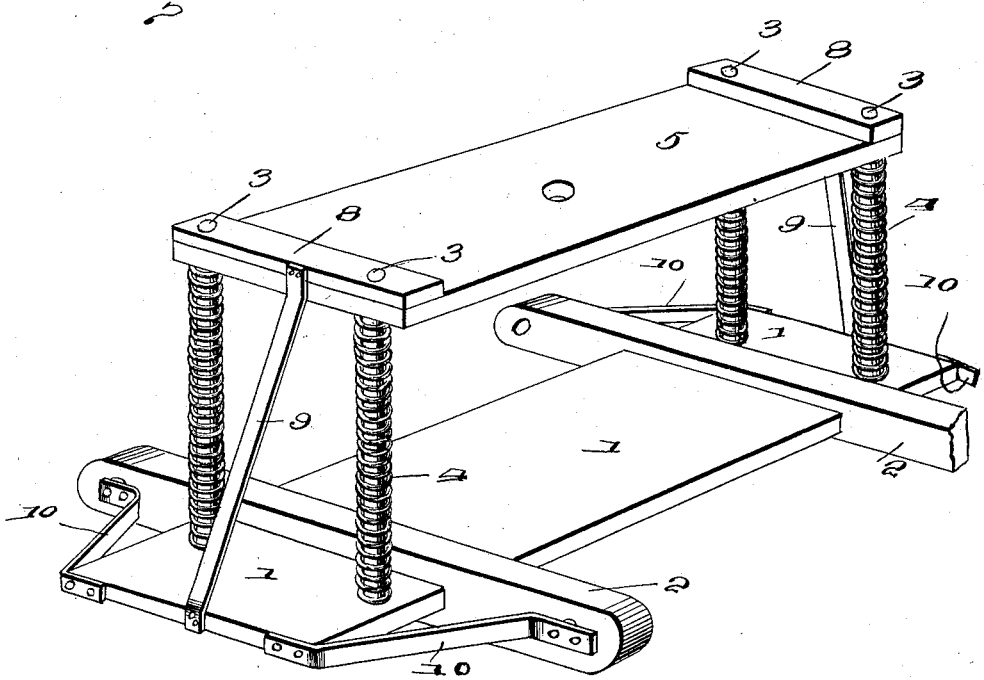

T. D. DERSHIMER.
CAR WHEEL.
APPLICATION FILED JULY 10, 1912.
1,043,757.
Patented Nov. 5, 1912.
2 SHEETS—SHEET 1.
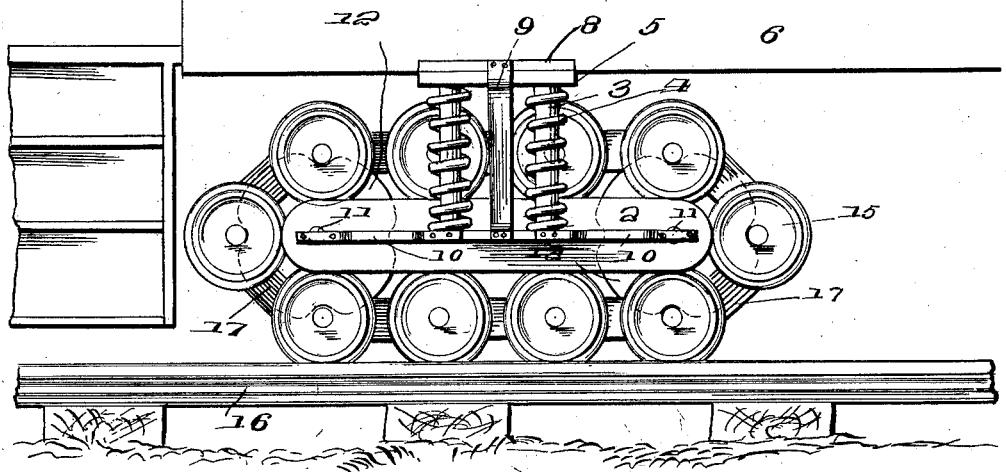
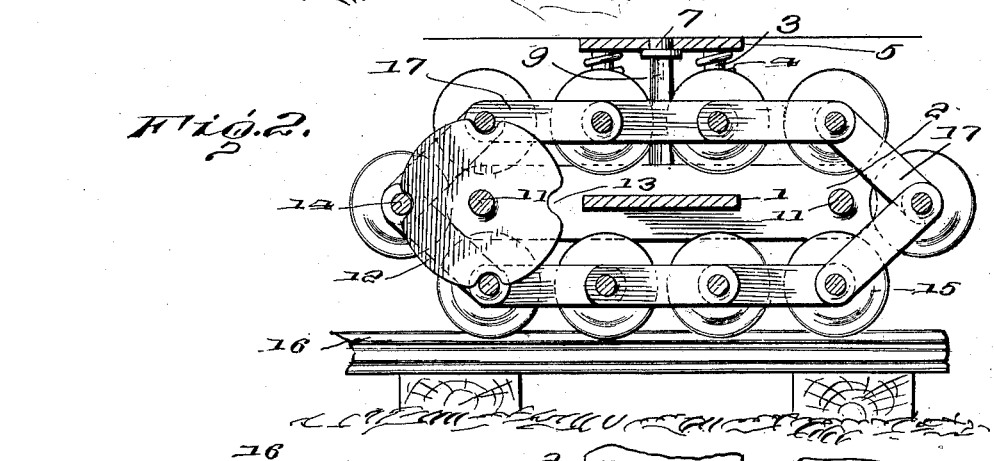
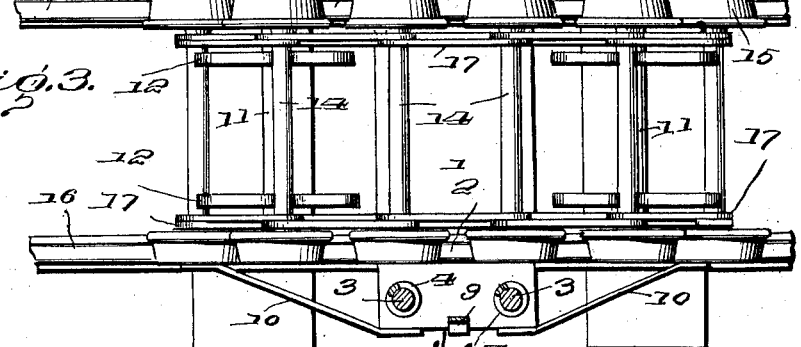

T. D. DERSHIMER.
CAR WHEEL.
APPLICATION FILED JULY 10, 1912.

1,043,757.

Patented Nov. 5, 1912.
2 SHEETS—SHEET 2.

Witnesses

Inventor
T. D. Dershimer

By
Attorneys

UNITED STATES PATENT OFFICE.

TITUS D. DERSHIMER, OF FALLS, PENNSYLVANIA.

CAR-WHEEL.

1,043,757.  Specification of Letters Patent.  Patented Nov. 5, 1912.

Application filed July 10, 1912. Serial No. 708,723.

*To all whom it may concern:*

Be it known that I, TITUS D. DERSHIMER, a citizen of the United States, residing at Falls, in the county of Wyoming and State of Pennsylvania, have invented certain new and useful Improvements in Car-Wheels, of which the following is a specification.

This invention relates to car wheels and has for its object the provision of means whereby the load will be carried by the wheels with a minimum amount of friction and also to provide a structure whereby the car will travel over the track smoothly without pounding and jarring and the wheels will be prevented from leaving the track.

The several objects of the invention are attained in the use of an apparatus such as is illustrated in the accompanying drawings, and the invention consists in certain novel features which will be hereinafter fully pointed out.

In the drawings: Figure 1 is a side elevation of a car truck embodying my improvements; Fig. 2 is a sectional elevation of the same; and Fig. 3 is a plan view with the bolster plate removed. Fig. 4 is a perspective view of the truck.

In carrying out my invention, I employ a truck or frame consisting of a cross bar or beam 1 and side bars or guides 2 secured near the ends of the said beam, the said side bars or guides being substantially of an elliptical form having parallel upper and lower edges and semi-circular ends. Rods 3 rise from the cross bar or beam 1 beyond the side bars or guides 2, and springs 4 are coiled around the pins or rods between the said beam 1 and a bolster 5 which is slidably mounted upon the said rods. The car body, indicated at 6, rests upon the said bolster 5 and is secured thereto by a king bolt 7 so that the weight of the car will be supported by the springs 4, as will be readily understood, the ends of the rods 3 extending through the ends of the bolster and being connected by cap plates 8. Braces 9 extend from the said cap plates to the ends of the cross bar or beam 1, and similar braces 10 extend from the ends of the cross bar or beam to the ends of the side bars or guides, as clearly shown.

Extending between and journaled in the guides 2 are shafts 11, and notched supporting and driving disks or wheels 12 are secured upon the said shafts between the guides. The notches 13 in the edges of these disks or wheels are spaced apart a distance equal to the distance between the axles 14 which carry the traction wheels 15. The traction wheels are arranged at the ends of the axles 14, and the length of the axles corresponds to the gage of the track so that the wheels 15 will roll upon the track rails 16. The several axles are connected by links 17 so that an endless chain of traction wheels is provided which pass around the guides 2 and run upon the same, so that, as the car is drawn over the track, the wheels 15 will roll upon the same and gradually pass from under the guides and then up around the rear ends thereof and then forwardly over the guides, as will be readily understood.

It will be readily noted that the structure provided by me presents a plurality of traction wheels to the track rails at all times, so that the wheels cannot leave the track unless the entire truck should be derailed. The flanges of the wheels engage the guides or side bars 2 so that the wheels cannot move out of the path provided for them and hence there is no tendency for the wheels to leave the track. The supporting and driving wheels or disks 12 will be actuated positively by the several axles 14 successively engaging the notches 13 in the said disks or wheels and the axles will consequently be caused to move around the ends of the side bars or guides smoothly and without any tendency to bind upon the same. Moreover, the provision of these guiding and driving wheels causes the traction wheels to describe a true arc as they pass around the ends of the guides so that they will not drop sharply onto the track rails but will move into contact with the same at a very slight angle and consequently will avoid any and all jarring contact. The wheels will also be held to the track rails until they are in a position to clear the rear ends of the guides without impinging forcibly against the same and consequently no rocking of the truck will occur.

The construction of the truck is such that a clear path is provided for the wheels while the bolster is strongly supported. The projecting ends of the guides are effectually braced to the ends of the main beam of the truck and the said beam preferably passes through said guides so as to more effectually support them.

My device is exceedingly simple in the construction and arrangement of its parts and its many advantages are thought to be evident without further detailed mention of the same.

What I claim is:—

1. The combination of a cross beam, spaced guides carried by said beam, the ends of the beam projecting beyond the guides, endless series of wheels mounted to travel on said guides, braces between the ends of the beams and the ends of the guides, rods rising from the beam beyond the guides, a bolster mounted on said rods, springs coiled around said rods between the beam and the bolster, caps connecting the upper ends of the rods above the bolster, and braces extending between said caps and the ends of the beam.

2. The combination of a cross beam, guides secured to said beam and projecting forwardly and rearwardly therefrom, the ends of the beam projecting laterally beyond the guides, rods rigid with the beam and rising therefrom between the guides and adjacent ends of the beams, caps connecting the upper ends of said rods, a bolster on said rods below the caps, springs coiled around said rods between the beam and the bolster, shafts journaled in the projecting ends of the guides and extending between the same, disks fixed on said shafts and having notches in their peripheries, endless chains of axle supported by said disks and engaging the notches therein, and traction wheels carried by said axles and running on said guides.

In testimony whereof I affix my signature in presence of two witnesses.

TITUS D. DERSHIMER. [L. S.]

Witnesses:
M. R. WALTER,
F. D. WALTER.